United States Patent [19]

Anderson

[11] Patent Number: 4,790,056

[45] **Date of Patent: * Dec. 13, 1988**

[54] RETAINING RING TOOL

[75] Inventor: J. Edward C. Anderson, Moreland Hills, Ohio

[73] Assignee: Milbar Corporation, Chagrin Falls, Ohio

[*] Notice: The portion of the term of this patent subsequent to Dec. 2, 2003 has been disclaimed.

[21] Appl. No.: 885,473

[22] Filed: Jul. 14, 1986

Related U.S. Application Data

[63] Continuation of Ser. No. 669,672, Nov. 8, 1984, Pat. No. 4,625,379.

[51] Int. Cl.[4] .............................................. B23P 19/04

[52] U.S. Cl. ...................................................... 29/229

[58] Field of Search .................... 29/225, 229; 81/302, 81/421, 423; 30/234, 235, 236, 252, 261, 262

[56] References Cited

U.S. PATENT DOCUMENTS

| | | | |
|---|---|---|---|
| 1,880,979 | 10/1932 | Parker | 269/239 |
| 2,042,273 | 5/1936 | Okun | 269/239 |
| 3,040,420 | 6/1962 | Kulp | 29/229 |
| 3,681,840 | 8/1972 | Pool | 29/229 |
| 4,280,265 | 7/1981 | Murphy | 29/229 |
| 4,316,315 | 2/1982 | Vogelnik | 29/229 |
| 4,476,750 | 10/1984 | Murphy | 29/229 |
| 4,625,379 | 12/1986 | Anderson | 29/229 |

*Primary Examiner*—Robert C. Watson
*Attorney, Agent, or Firm*—Watts, Hoffmann, Fisher & Heinke

[57] ABSTRACT

A universal retaining ring tool that is shiftable between internal and external modes of operation. The tool includes a pair of pivotally connected handles, a pair of jaw members selectively coupled to the handles by a latching arrangement including two transversely slidable latch members. In one position of the latch members one handle member is coupled to one jaw member and the other handle is coupled to the other jaw member. When the latch members are switched, the one handle is coupled to the other jaw member and the other handle is coupled to the one jaw member. Removable tips are secured to each jaw member by an associated clamping plate that includes a corner that diverges from the overall plane of the clamping plate towards the associated jaw member. The fastener for securing the clamping plate is critically so that a positive clamping force is exerted on the tip in a region where it enters the jaw.

6 Claims, 2 Drawing Sheets

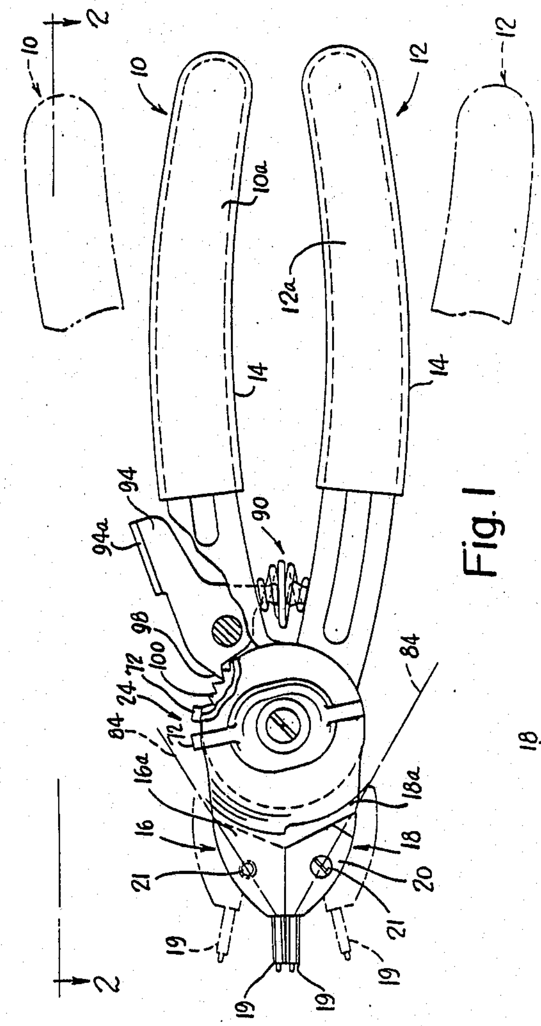
Fig. I
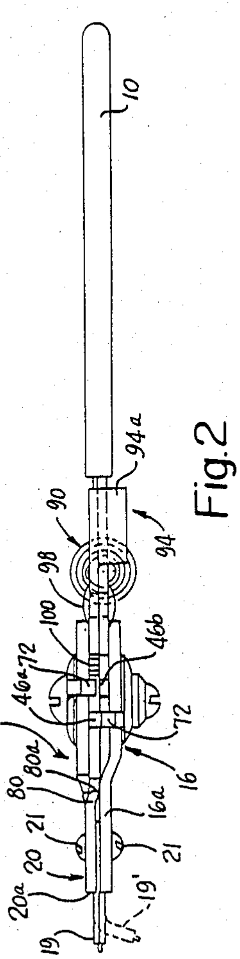
Fig.2

RETAINING RING TOOL

This is a continuation of application Ser. No. 669,672, filed 11/8/84 now U.S. Pat. No. 4,625,379.

DESCRIPTION

1. Technical Field

The present invention relates generally to hand tools and in particular to apparatus for removing and installing resilient retaining rings.

2. Background Art

Resilient retaining rings such as "snap rings", "E-rings" and "C-rings" are employed to maintain the position of elements on a shaft or to maintain the position of elements within a bore. To facilitate removal and installation, some rings are formed with apertures at terminating ends by which a ring is engaged and then either expanded or contracted by a suitable tool.

Retaining rings are supplied as "internal" or "external". The external type are usually used to retain elements such as bearings, gears, or pulleys on shafts. An external ring normally engages an annular groove formed in a shaft to inhibit axial movement of a shaft mounted element. The external-type ring is installed by expanding the ring until its internal diameter is greater than the shaft diameter.

The internal type of retaining ring is used to retain an element such as bearings or shafts, within a bore. In order to install a ring it is contracted in order to pass into the bore and then allowed to expand to engage an internal groove formed around the bore.

Normally tools for installing and removing external and internal type retaining rings are substantially different. In the case of external rings, the tool must expand the ring to increase its internal diameter in order to clear a shaft whereas in the case of internal rings, the tool must contract the ring in order to decrease its external diameter to enable the ring to clear a bore. For this reason, retaining ring pliers are supplied as single purpose "external" and "internal" types. These single purpose pliers are each intended to remove or install one type of ring only and therefore a mechanic is required to have both types of pliers if he is to remove both external and internal rings.

In the past, dual purpose retaining ring pliers have been suggested or tried. In one proposed construction, the tool included a single pivot shaft, but two pivot holes. When the shaft was placed in one pivot hole, the tool acted as an external retaining ring plier and when placed in the other hole, the tool became an internal retaining ring plier. In order to switch between internal and external functions, the tool required disassembly.

In another construction, one handle of the retaining ring plier is articulated intermediate a jaw pivot point and the end of the handle. The handle also includes a movable link which in one position locks the one handle to prevent articulation and causes the tool to act as an internal type retaining ring plier. The link is movable to another position which allows articulation of one handle with respect to the jaw pivot point and causes the tool to act as an external retaining ring tool. The problem with this latter construction is that movement of the link changes the mechanical advantage so that the force needed to operate the tool is different when it was used in the "internal" mode compared to the "external" mode.

In still another construction, a pair of jaws is selectively engaged with a pair of handles utilizing axially movable pins. It is believed that the suggested construction is expensive to manufacture and changing from "internal" to "external" functions is cumbersome since movement of the relatively small pins is difficult and requires a separate tool to effect movement in the pins.

Many commercially available and proposed retaining ring tools include a removable tip. Clamping members associated with each jaw typically clamp the tip in a groove formed in the jaw and/or the clamping plate. The mounting arrangements must not only secure the longitudinal position of a tip, but in the case of angled tips, must also restrain or inhibit rotation of the tip with respect to the jaw. It has been found that with some prior art clamping arrangements insufficient clamping force is exerted on the tips to inhibit rotation when the tip is subjected to high retaining ring forces. Rotation of the tip within its groove can often damage not only the tip but the tool itself in addition to causing frustration to the user.

DISCLOSURE OF INVENTION

The present invention provides a new and improved hand tool for removing and installing both external and internal retaining rings. The tool is easily switched between internal and external modes of operation and the mechanical advantage is the same for both modes.

In the preferred embodiment, the hand tool comprises a pair of pivotally connected handles and a pair of jaw members selectively couplable to the handles by a latching arrangement including transversely slidable latch members. The latch members are movable between two positions. In one position one handle is coupled to one jaw member and the other handle is coupled to the other jaw member. In a second position, the one handle is coupled to the other jaw member and the other handle is coupled to the one jaw member. In one position of the latch members, the tool operates as an internal retaining ring tool and in the other position the tool operates as an external retaining ring tool.

In the preferred construction, each handle includes a jaw driving section on one end. Each jaw driving section includes two segments, each segment including structure couplable with one of the jaw members by operation of the associated latch member.

Each latch member is slidably movable between two positions. In one position, the member interconnects structure on one segment of one handle with one jaw member. In the other position, the latch member interconnects the other segment of the one handle with the other jaw member. The other latch member provides a similar function and selectively couples either the one segment of the other handle with the other jaw member or the other segment of the other handle with the one jaw member. In operation, the latch members are concurrently moved between the two positions so that each jaw member is always coupled to one of the handles.

In the illustrated embodiment, the engagement structure on the jaw driving sections of the handles and the jaw members comprise peripheral slot-like recesses. Each latch member includes a prong disposed in a plane that diverges from a rotational plane of the tool as defined by a pivot axis for the handles. In the preferred embodiment the prong is disposed in a plane substantially orthogonal to the rotational plane and is sized to slidably fit within a recess. The depth of prong is dimensioned such that adjacent recesses in a jaw and a jaw driving segment are co-engaged.

According to the exemplary embodiment, both latching members are shiftable when the recesses in the handles and the jaws are aligned. The prongs define adjacent abutment surfaces by which the members are concurrently shifted from one position to the other. In this way, changing from the internal to the external mode of operation is easily accomplished.

According to a feature of the invention, a ratchet mechanism is included which locks the relative position of the handles as they are squeezed when contracting or expanding a retaining ring. With this feature, installation of either an external or an internal retaining ring is facilitated since the ratchet mechanism prevents the handles from reopening due to the tension exerted by a retaining ring held by the jaws. In the preferred embodiment, the ratchet mechanism includes a lever mounted to one of the handles which is engageable with teeth formed on the jaw driving section of the other handle. The lever is spring loaded towards engagement with the teeth so that as the handles are squeezed a ratchet pawl on the lever engages successive teeth preventing the handles from pivoting outwardly.

According to another feature of the invention, each jaw member includes a clamping arrangement for securing a removable tip configured to engage an aperture in the retaining ring. The clamping arrangement includes a plate member fixed to the jaw by a suitable fastener. The plate includes a portion, preferably a corner, bent towards the jaw so that as the plate is fastened to the jaw, a greater clamping force is exerted near the end of the jaw from where the tip protrudes. The disclosed arrangement provides an enhanced securement of the tip to the jaw.

In the preferred embodiment, the segments defined by the jaw driving sections of each handle are disposed in offset planes. One segment of each jaw driving section defines a pivot aperture defined in part by an annular wall. The segments are disposed in spaced, parallel planes and are joined together by a bridging section. When the handle members are assembled, the segments of the handle members are at least partially interleaved such that a portion of the annular wall defined by a segment on one handle rotatably abuts an arcuate surface on the adjacent segment of the other handle. The bridging sections that join the respective segments also define stops which limit the outward movement of the handles.

In the disclosed and illustrated embodiment, the handles, jaw members and latch members are all formed from stampings yielding in extremely useful but relatively inexpensive retaining ring tool. The tool eliminates the need for separate internal and external retaining ring pliers and is easily switchable between external and internal operating modes.

Additional features will become apparent and a fuller understanding obtained by reading the following detailed description made in connection with the accompanying drawings.

BRIEF DESCRIPTION OF DRAWINGS

FIG. 1 is a plan view of a retaining ring removal and installation tool constructed in accordance with a preferred embodiment of the invention;

FIG. 2 is a side view of the tool, and

BEST MODE FOR CARRYING OUT THE INVENTION

Figure 3:
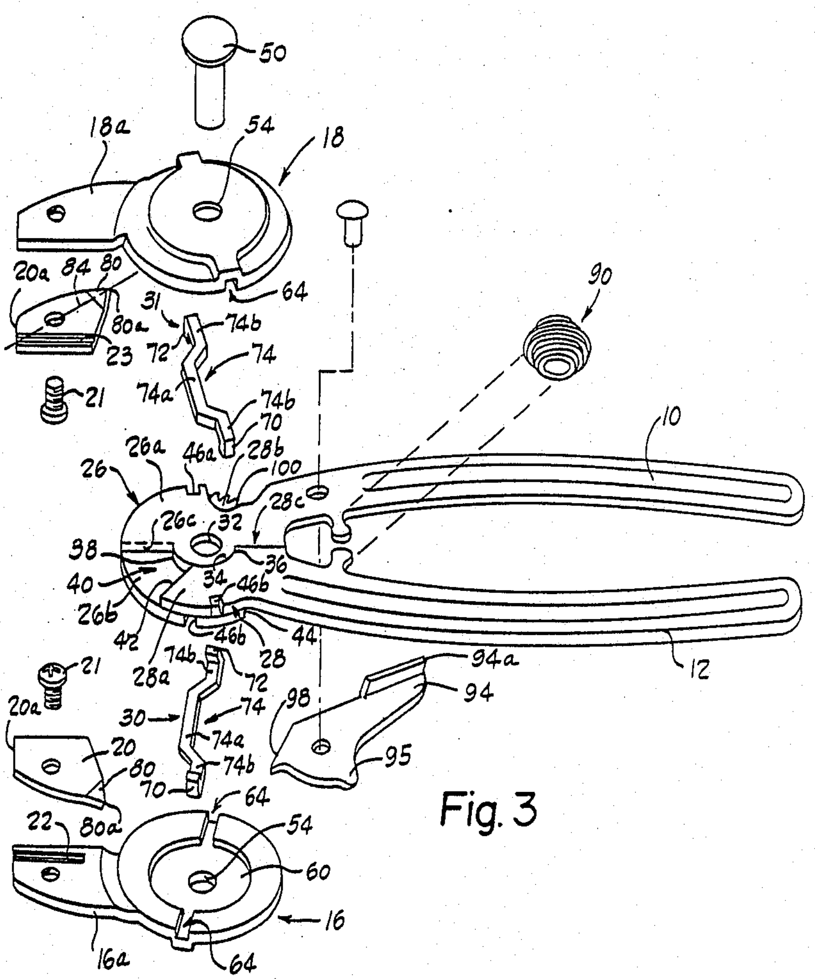
FIG. 3 is an exploded view of the tool.

FIG. 1 illustrates the overall construction of a hand tool for removing and installing internal or external type resilient retaining rings. The tool comprises a pair of operator actuated handles 10, 12 each defining respective grip portions **10*a*, 12*a*. In the illustrated embodiment, the grip portions 10*a*, 12*a* are covered by plastic grip coverings 14. The handles 10, 12 are squeezed by an operator in order to either open or close a pair of jaw heads 16, 18, depending on the operating mode of the tool. The jaw heads define respective jaws 16*a*, 18*a* that each removably mount a conventional ring engaging tip 19 engageable with an aperture formed on a retaining ring (not shown). As is known in the art and shown in FIG. 2 various tip configurations 19, 19′ are available to accommodate a multitude of rings and ring applications. The jaw heads each include an associated clamp plate 20 by which the tips 19 are clamped to the jaws 16*a*, 18*a*. A threaded fastener 21 secures the plate 20 to the respective jaw. Referring to FIG. 3, a channel-like groove 22 is formed in each of the jaws 16*a*, 18*a* which is sized to receive the tip 19. A companion groove 23 is formed in each clamp plate 20 and overlies the groove 22 formed in the jaw when the plate 20** is mounted in position.

In one mode of operation, the tool is adapted to manipulate internal retaining rings and in this mode, squeezing the handles produces movement in the jaw heads 16, 18 and associated tips 19 towards each other. In the "external" mode, squeezing the handles produces outward movement of the tips 19 thus enabling the jaw heads to expand an external retaining ring. It should be noted that in FIG. 1, the tool is shown in its "internal" mode with the handles 10, 12 shown in their squeezed positions. The phantom lines indicate the positions assumed by the handles 10, 12 and the jaw heads 16, 18 when the handles are released. When the tool is switched to the "external" mode, squeezing the handles 10, 12 causes the jaw heads 16, 18 to separate and assume the open position indicated by the phantom lines.

In accordance with the invention, the tool includes a latching mechanism indicated generally by the reference character 24 in FIG. 1, by which the tool is switched between "internal" and "external" modes of operation.

Referring also to FIG. 3, the handles 10, 12 each include a respective jaw driving section 26, 28. As will be explained, slidable bar-like latch members 30, 31 selectively couple the jaw heads 16, 18 to the jaw driving sections 26, 28 of the handles 10, 12.

As seen best in FIG. 3, the jaw driving sections 26, 28 comprise two segments disposed in spaced planes. In particular, the jaw driving section 26 includes a first segment **26*a* which merges with its associated handle 10. A second segment 26*b* is arcuate and extends in a plane disposed below the plane of the segment 26*a*. A bridging section 26*c* joins the two segments. The jaw driving section 28 includes similar segments and in particular includes a segment 28*a* that merges with the handle 12 and a segment 28*b* disposed below the plane of the segment 28*a*. A bridging section, indicated generally by the reference character 28*c* in FIG. 3 joins the segments 28*a*, 28*b***.

The segments of the jaw driving sections 26, 28 are configured to partially interleave with each other, as seen in FIG. 3. The segments **26*a*, 28*a*** when assembled are disposed in a substantially common plane. The segments 26*b*, 28*b* are also disposed in a substantially common plane that is spaced below (as viewed in FIG. 3) the plane of the segments 26*a*, 28*a*.

The segment 26*a* of the section 26 defines a pivot aperture 32. A semi-annular wall 34 also forms part of the segment 26*a* and at least partially defines the pivot aperture. The segment 28*a* of the handle 12 defines an arcuate wall 36 which abuttably engages the aperture wall 34. The segment 28*b* of the handle 12 defines a similar pivot structure which is engaged by a semi-annular wall (not shown) forming part of the segment 26*b* (indicated generally by the reference character 38). The arcuate surfaces 36, 38 and annular wall segments 34 provide bearing surfaces between the interleaved jaw driving sections 26, 28 of the handles 10, 12.

As seen in FIG. 3, the segment 28*a* of the jaw driving section 28 defines a gap 40 between an end surface 42 and the bridging section 26*c*. This gap defines the limits of outward movement of the handles 10, 12. It should be apparent as the handles are separated, the gap defined between the bridging section 26*c* and the end surface 42 diminishes. Eventually, the end surface 42 abuttably contacts the bridging section preventing further outward movement of the handle members. A similar gap is defined between an end surface 44 defined by the segment 26*b* and the bridging section 28*c*.

Each of the segments includes a peripheral recess disposed 180° apart. In particular, the segments 26*a* and 26*b* include respective notches 46*a*, 46*b*. The segments 28*a*, 28*b* also define respective notches 46*a*, 46*b*. The jaw heads 16, 18 and handles 10, 12 are pivotally secured together by a pivot pin 50 that extends through apertures 54 formed in the jaw heads and through the apertures 32 defined by the pivot structure in each of the jaw driving sections 26, 28. The pivot pin 50 may take the form of a rivet, shoulder screw or other known fastener. When the pivot pin 50 is secured, the handles 10, 12 as well as the jaw heads 16, 18 are pivotally movable with respect to each other.

The jaw heads 16, 18 each include a circular recess 60 which is axially aligned with the associated pivot apertures 54. Each recess 60 is interrupted by a pair of aligned passages 64 which together define a guideway for an associated latch member 30, 31.

The latch members 30, 31 are operative to couple an associated jaw head with one of the jaw driving segments 26, 28. Each latch member is defined by a pair of spaced prongs 70, 72 joined by an elongate web 74. The prongs 70, 72 are disposed in planes that diverge from the rotational plane of the tool as defined by the pivot 50. Preferably the prongs are oriented at substantially 90° with respect to the rotational plane. The web includes an offset intermediate section 74*a* defining a clearance gap for the pivot pin 50. The gap defines the transverse limits of motion for each latch member 30, 31. Outer web sections 74*b* disposed on either side of the intermediate section 74*a* are sized to be slidably received by the aligned passages 64 formed in the associated jaw head. When assembled, the pivot pin 50 for securing the assembly extends through the gap defined between the guide sections 74*b*. The latch members 30, 31 are sized so that at their extremes of movement one of the prongs 70, 72 of each latch member 30, 31 is received in one of the notch-like recesses 46*a*, 46*b* formed in each jaw driving section 26, 28. In the preferred embodiment the line of action for each latch member intersects the pivot axis defined by the pivot pin 50.

For example, when the lower latch member 30 (as viewed in FIG. 3) is moved rearwardly (i.e, movement such that the prong 70 moves toward the pivot) the prong 70 enters the recess 46*b* in the segment 26*b* of the jaw driving section 26 forming part of the handle 10. When moved in this position, the prong 70 couples the jaw 16*a* to the handle 10 so that both move as one.

Similarly, when the upper latch member 31 is moved rearwardly, the prong 70 of the upper latch member moves into the recess 46*b* of the segment 28*a* of the jaw driving section 28 forming part of the handle 12 so that the upper jaw head 18 and the handle 12 move as one. It should be apparent that, with the upper jaw 18 coupled to the handle 12 and the lower jaw 16 coupled to the handle 10, movement in the handles towards each other produces converging movement in the jaws 16*a*, 18*a* towards each other. Thus, in this position, the hand tool is operative to remove and install internal type retaining rings since squeezing the handles 10, 12 will contract a retaining ring held by the tips 19.

To change the tool to an external mode, the latch members 30, 31 are shifted forwardly, as viewed in FIG. 3, that is, motion in which the prongs 70 move away from the pivot point. In particular, the prong 72 of the lower latch member enters the recess 46*b* formed in the segment 28*b* of the jaw driving section 28 and is thus coupled to the handle 12. The upper latch member 31 is moved so that its prong 72 engages the recess 46*a* in the segment 26*a* of the handle 10 and thus the upper jaw head 18 is interconnected to the handle 10. With the latch members 30, 31 in this reversed position, the upper and lower jaws are operatively connected to the handles 10, 12 respectively and squeezing the handles causes the jaws 16*a*, 18*a* to separate. In this configuration, the hand tool is operative to remove and install external type retaining rings since squeezing the handles tends to expand a retaining ring held by the tips 19.

In summary, the hand tool is switched between internal and external modes by aligning the recesses 46*a*, 46*b* of the jaw driving sections 26, 28 and then concurrently shifting both latch members 30, 31 to cause one set of prongs, either the prongs 70 or the prongs 72 to engage a pair of recesses 46*a*, 46*b* of the jaw driving sections 26, 28. In one position, the latch members 30, 31 couple the lower jaw head 16 to the handle 12 and the upper jaw head 18 to the handle 10 whereas in the other position, the lower jaw head 16 is coupled to the handle 10 and the upper jaw is coupled to the handle 12.

According to a feature of the invention, the tip clamps 20 each include a diverging corner 80 which is bent towards the plane of the associated jaw. With this construction, the clamping force exerted by the plate 20 on the tip 19 is directed towards the leading edge 20*a* of the plate 20 and thus enhances the securement of the tip to the jaw.

In order for it to provide a greater clamping force at the leading edge 20*a* of the plate 20 the clamping screw 21 is critically located. As seen best in FIG. 1, the centerline of the clamping screw 21 lies on an imaginary line 84 that extends through the center of the diverging corner 80 and point where the tip groove commences at the leading edge 20*a* of the clamp. In the preferred arrangement, the imaginary line 84 intersects the center of the tip groove. However, the clamping screw may be located on an imaginary line that intersects the tip groove at other than the exact center of the groove and still be encompassed by the present invention. With the disclosed construction, as the clamping screw 21 is tightened, the portion of the clamp plate 20 to the left of the clamping screw 21 (as viewed in FIG. 1) is levered downwardly by the fulcrum action provided by the tip 80*a* of the diverging corner 80. Consequently, a major portion of the clamping force is exerted on the portion of the tip 19 clamped by the left portion (as viewed in the figures) of the clamping plate 20 thus providing a positive securement of the tip 19 in the region where it enters the groove 23 defined by the clamp plate 20 and the associated head.

In a preferred embodiment, a biasing spring 90 urges the handles apart. According to a feature of the invention, a ratchet mechanism is provided for locking the handles to inhibit separation. The mechanism includes a pivotally mounted ratchet lever 94 pivotally secured to one of the handles. In the illustrated embodiment the ratchet lever 94 is mounted to the handle 10 and includes a tab 95 which engages the spring 90. The spring thus not only biases the handles apart but also biases the lever in a counterclockwise direction (as viewed in FIG. 3). The ratchet lever includes a finger engaging portion 94*a* which overlies the outside edge of the handle 10. A ratchel pawl 98 is also defined by the lever 94 and located to one side of the pivot opposite the spring engaging tab 95. The pawl 98 is engageable with one of a plurality of teeth 100 formed on the periphery of the segment 28*b* of the jaw driving section 28 that is part of the handle 12. It should be apparent that when the handles are squeezed and the ratchet lever 94 released, the pawl 98 engages one of the teeth 100. The ratchet mechanism engages successive teeth 100 as the handles 10, 12 are squeezed and prevents the handles from reopening. Depressing the finger portion 94*a* of the ratchet lever 94 disengages the pawl 98 from the ratchet teeth 100 and allows the handles 10, 12 to reopen. With the preferred construction, tension on a retaining ring can be maintained during installation and/or removal without effort by the operator. In use, the retaining ring is engaged by the jaws 16*a* 16*b* (via the tips 19) and the handles 10, 12 are then squeezed to tension the retaining ring. As the handles are squeezed, the ratchet lever 94 engages the teeth 100 to maintain the position of the handles and prevent release of the retaining ring. When release of the retaining ring is desired, the ratchet lever 94 is depressed in order to disengage the pawl 98 from the teeth 100 enabling the handles to separate.

The present invention thus provides an inexpensive tool for removing and installing both internal and external retaining rings. The tool is easily switched between the internal and external modes and in particular the operating modes are changed by merely shifting the pair of latch members 30, 31 that cooperate with the jaw driving sections 26, 28 of the handles 10, 12 to selectively couple the jaw heads 16, 18 to the handles. A ratchet mechanism facilitates operation of the tool by preventing separation of the handles to maintain tension on a retaining ring held by the jaws 16*a*, 18*a* without substantial effort by the operator.

The embodiment of the tool shown in FIGS. 1-3 is constructed from stampings, the making of which is known by those skilled in the art. It should also be recognized that other relatively inexpensive methods of manufacture could be used to produce the disclosed tool and are all contemplated by the present invention. For example, one or more of the tool components such as the jaw head 16, 18 and/or the handles 10, 12 can be produced using powdered metal technology. It will be appreciated by those skilled in the art that, should the components be constructed of powdered metal, dimensional changes would have to be made to accommodate well known differences in the material characteristics of powdered metal as compared with stampings.

Although the invention has been described with a certain degree of particularity, it should be understood that various changes can be made to it by those skilled in the art without departing from the spirit or scope of the invention as hereinafter claimed.

I claim:

1. Apparatus for manipulating resilient retaining rings or the like, comprising:

(a) a pair of handles operatively connected to a pair of movable jaw members;

(b) a pair of ring engaging tips each associated with a different one of said jaw members;

(c) a pair of clamping plate members each secured to an associated jaw member, each plate member including a portion overlying a portion of the associated jaw member;

(d) a first of the associated members of each associated pair including tip surfaces for engaging complemental surfaces of said associated tip;

(e) at least one member of each pair of associated members including a projection for engaging the other member of the associated pair at a location remote from an outward end of said tip surface; and, (f) each of said clamping plate members including an aperture by which said clamping plate is secured to its associated jaw member by a fastener, said aperture being located such that an imaginary line extending between said projection and said aperture intersects the outward end of an associated tip surface.

2. The apparatus of claim 1 wherein each of the second of the members of each associated pair also includes tip engaging surfaces for engaging further complemental surfaces of said associated tip.

3. The apparatus of claim 1 wherein said at least one member of each pair is the plate member.

4. A plier tool comprising:

(a) a pair of articulatable jaw members;

(b) a pair of handles operably connected to the jaw members for selectively effecting jaw articulation;

(c) a pair of tips respectively associated with the jaw members, each tip including at least one workpiece engaging surface near its outer end;

(d) a clamp member associated with each jaw member, said clamp member and associated jaw member together defining a clamping assembly;

(e) said clamping assembly defining a recess for receiving a section of the associated tip;

(f) fastening means for generating a clamping force in said clamping assembly; and, (g) each clamping assembly including structure establishing a fulcrum at a location opposite a location of fastening means application and constructed to cause the greatest clamping force application to an associated tip to be on a portion of the tip section nearest the outward end of said recess whereby twisting of said tip section in said clamping assembly is substantially inhibited.

5. In a ring manipulating tool, an improved jaw assembly comprising:

(a) a pair of articulatable jaw members;

(b) a pair of tips respectively associated with the jaw members, each tip including at least one workpiece engaging surface near its outer end;

(c) a clamp member associated with each jaw member, said clamp member and associated jaw member together defining a clamping subassembly and a recess for receiving a section of an associated tip;

(d) fastening means for generating a clamping force in said clamping subassembly whereby said section of the associated tip is clamped between the clamping member and jaw member; and, (e) each clamping subassembly including structure establishing a fulcrum at a location opposite a location of fastening means application and constructed to cause the greatest clamping force application to the associated tip to be on a portion of the tip section nearest an outer end of said recess whereby twisting of said tip section in said clamping assembly is substantially inhibited.

6. The apparatus of claim 5 wherein said fulcrum established by each clamping subassembly is formed by a portion of said clamp member that is bent towards said associated jaw member.

* * * * *